United States Patent
Wright et al.

(10) Patent No.: US 12,167,077 B2
(45) Date of Patent: *Dec. 10, 2024

(54) METHODS AND APPARATUS TO IDENTIFY ALTERNATE LANGUAGE VERSIONS OF MEDIA BASED ON SIGNATURE MATCHING

(71) Applicant: The Nielsen Company (US), LLC, New York, NY (US)

(72) Inventors: David Howell Wright, Safety Harbor, FL (US); Daniel Nelson, Tampa, FL (US); Raghuram Ranganathan, Tampa, FL (US); Derrick Mcculley, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,551

(22) Filed: Jul. 31, 2023

(65) Prior Publication Data

US 2024/0031642 A1 Jan. 25, 2024

Related U.S. Application Data

(63) Continuation of application No. 16/888,297, filed on May 29, 2020, now Pat. No. 11,750,878.

(51) Int. Cl.
*H04N 21/44* (2011.01)
*H04N 21/442* (2011.01)
*H04N 21/845* (2011.01)

(52) U.S. Cl.
CPC . *H04N 21/44008* (2013.01); *H04N 21/44204* (2013.01); *H04N 21/8456* (2013.01)

(58) Field of Classification Search
CPC ....... H04N 21/44008; H04N 21/44204; H04N 21/8456
See application file for complete search history.

(56) References Cited

U.S. PATENT DOCUMENTS

| | | | |
|---|---|---|---|
| 10,943,583 B1* | 3/2021 | Gandhe | G10L 15/183 |
| 2019/0311745 A1* | 10/2019 | Shenkler | G10L 21/055 |

* cited by examiner

*Primary Examiner* — Chenea Davis

(57) ABSTRACT

Methods and apparatus to identify alternate language versions of media based on signature matching are disclosed. Example apparatus disclosed herein include a signature matcher to compare signatures in monitored data with reference signatures to determine signature match strengths associated with portions of the monitored data, the reference signatures associated with reference media assets. Disclosed example apparatus also include a data segmenter to divide the monitored data into first and second segments, the first segments including temporally adjacent portions of the monitored data having signature match strengths that satisfy a threshold, the second segments including temporally adjacent portions of the monitored data having signature match strengths that do not satisfy the threshold. Disclosed example apparatus further includes a trend determiner to determine, based on a pattern of the first and second segments, whether the monitored data is associated with an alternative language version of one of the reference media assets.

20 Claims, 6 Drawing Sheets

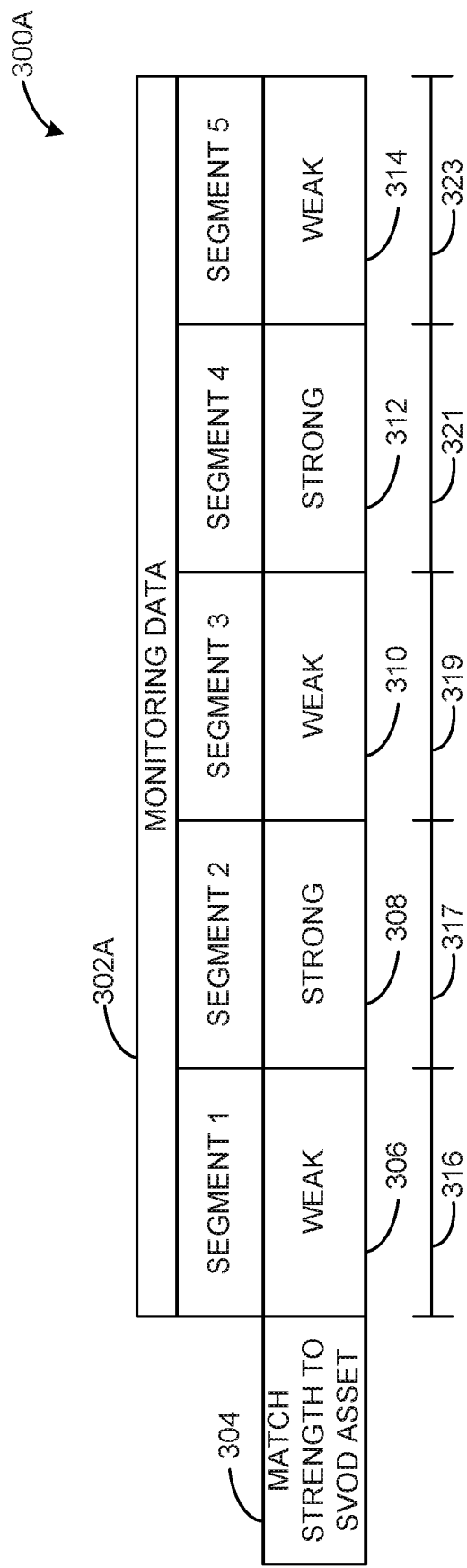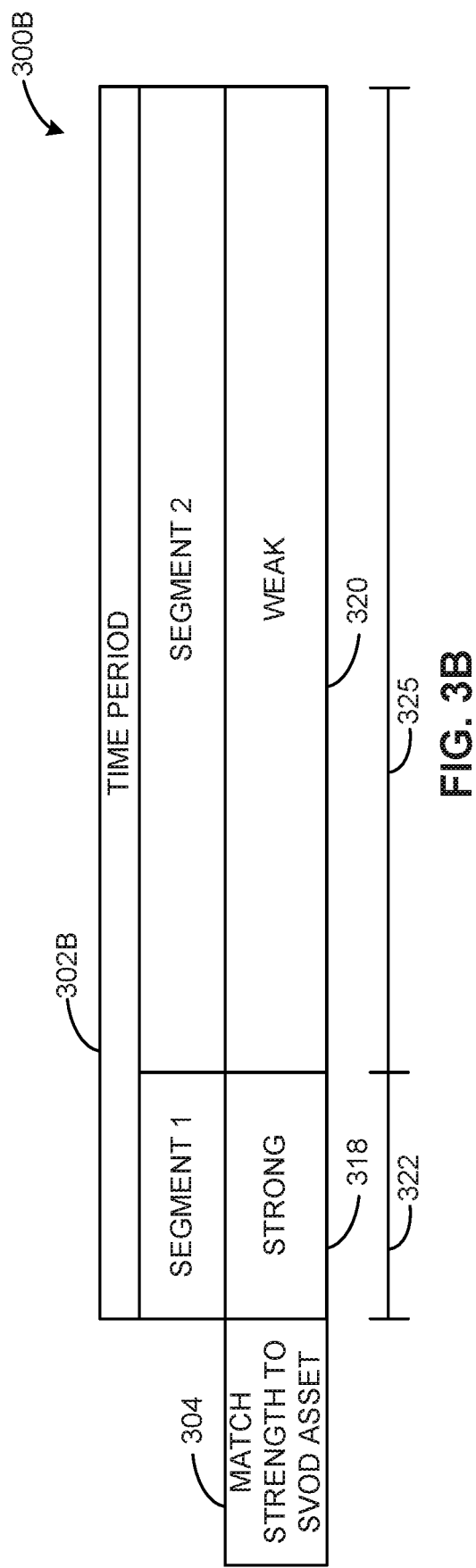

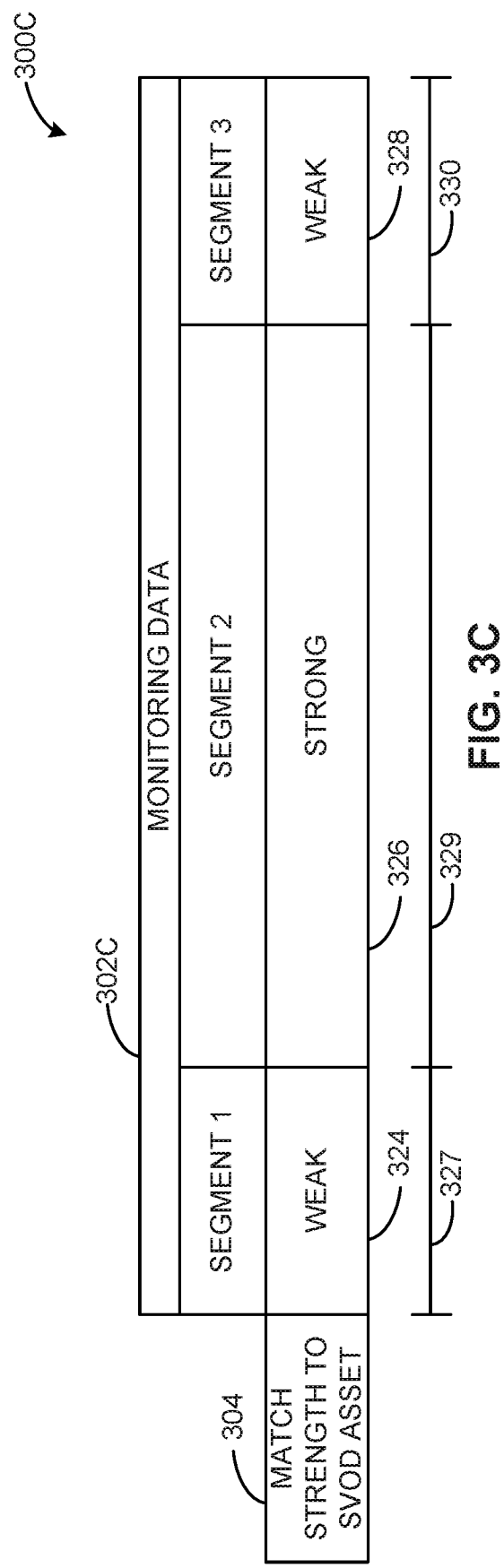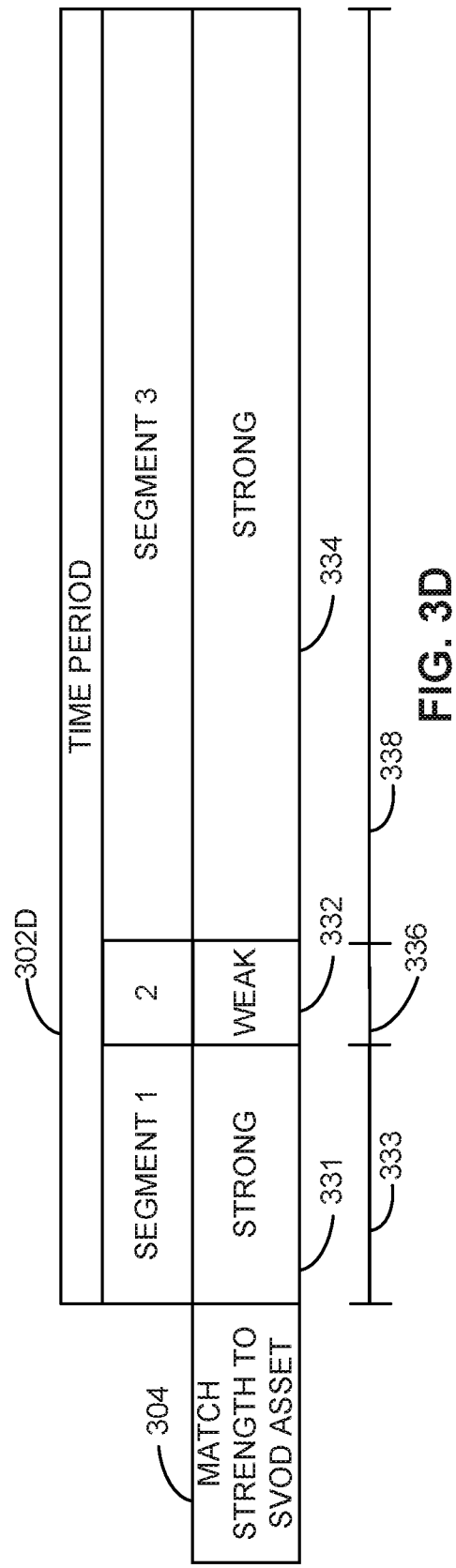

METHODS AND APPARATUS TO IDENTIFY ALTERNATE LANGUAGE VERSIONS OF MEDIA BASED ON SIGNATURE MATCHING

CROSS-REFERENCE TO RELATED APPLICATIONS

The present disclosure is a continuation U.S. patent application Ser. No. 16/888,297, filed May 29, 2020, now U.S. Pat. No. 11,750,878, which is hereby incorporated herein by reference in its entirety.

FIELD OF THE DISCLOSURE

This disclosure relates generally to media identification systems, and, more particularly, to methods and apparatus to identify alternate language versions of media based on signature matching.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

FIGS. 3A-3D are block diagrams of example outputs to an example data segmenter included in the example meter data analyzer of FIG. 2.

The figures are not to scale. In general, the same reference numbers will be used throughout the drawing(s) and accompanying written description to refer to the same or like parts.

Figure 1:
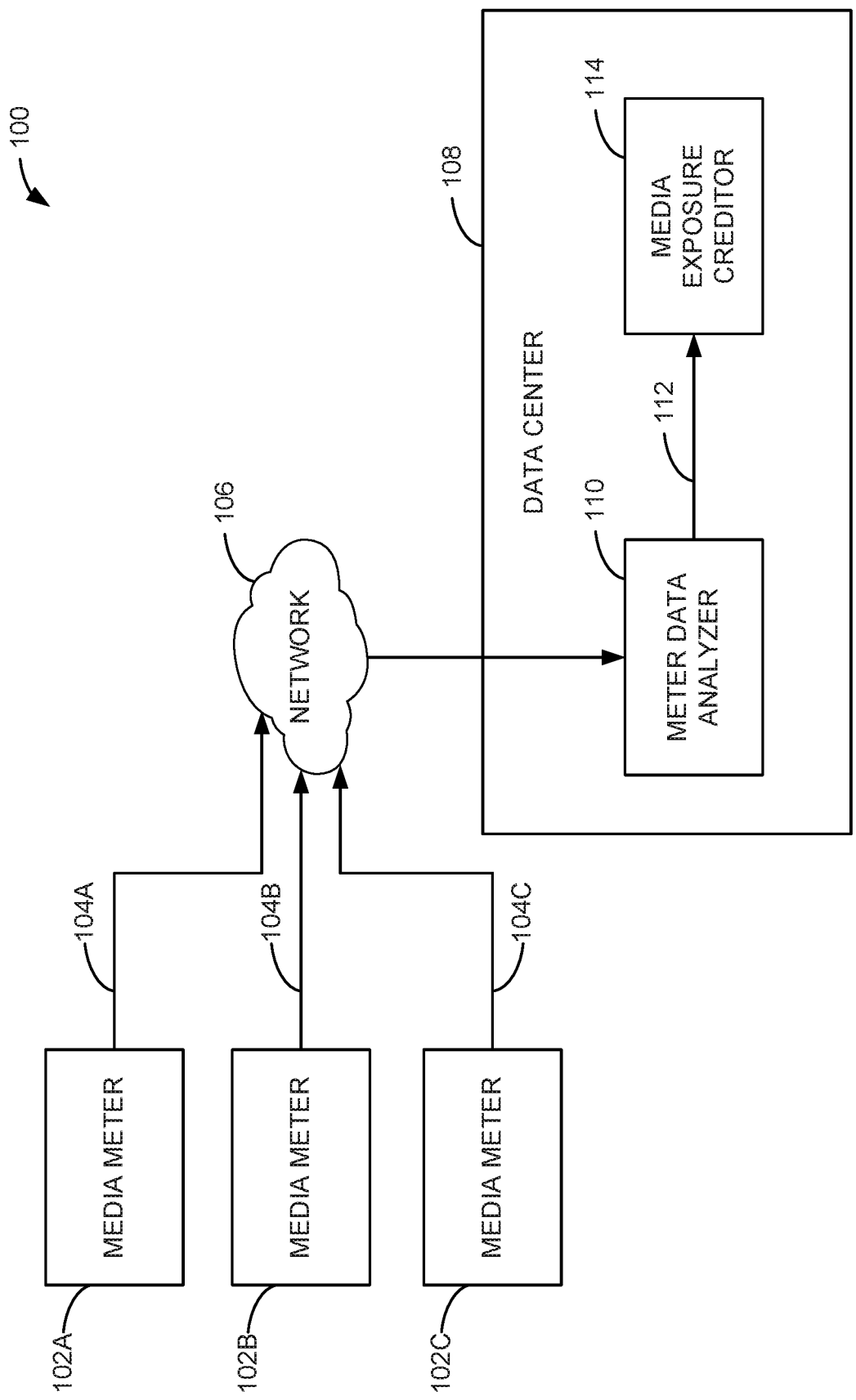
FIG. 1 is a block diagram of an example environment in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature(s), these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company, etc.) desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitored data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and/or watermarks. These references are generated by a media monitoring entity (e.g., at a media monitoring station (MMS), etc.) by monitoring a media source feed, determining signatures associated with the media source feed and/or analyzing media hosted on streaming services. In some examples, media monitoring entities can generate reference signatures by analyzing download media (e.g., from a streaming video provider, etc.). In some examples, reference media can be transmitted to the media monitoring entity from one or more media providers to cover media assets that are not live broadcasted (e.g., a subscription video on demand (SVOD) asset). In some examples, a "media asset" refers to any individual, collection, or portion/piece of media of interest (e.g., a commercial, a song, a movie, an episode of television show, etc.) Media assets can be identified via unique media identifiers (e.g., a name of the media asset, a metadata tag, etc.). Media assets can be presented by any type of media presentation technology (e.g., via streaming, via live broadcast, from a physical medium, etc.). In some examples, media monitoring entities store generated reference databases and gathered monitored data on cloud storage services (e.g., AMAZON WEB SERVICES®, etc.). To allow the crediting of time-shifted or on-demand viewing (e.g., viewing media via a digital video recorder (DVR), etc.), the stored references are retained for a period time after the initial presentation of the media. Additionally or alternatively, to allow the crediting of on-demand viewing (e.g., viewing media using an on-demand service, viewing media hosted on a streaming service, etc.), the stored references may be retained indefinitely.

In some examples, media monitoring entities measure subscription video on demand (SVOD) viewership using media monitors associated with panelists. In some examples, an SVOD asset is a media asset hosted on a video on-demand service or a streaming service. SVOD assets can include episodes of a TV series hosted on a streaming service, a movie hosted on a streaming service, a commercial inserted into another SVOD asset, etc. While examples disclosed herein are described with reference to SVOD assets, other types of media assets (e.g., music, podcasts, etc.) presented via an on-demand or streaming service (e.g., SPOTIFY®, etc.) can also be monitored by the examples disclosed herein.

When a panelist views a SVOD asset, the media monitor generates a signature via passive signature generation. That is, the media monitor processes the audio of the presented media asset to generate audio signatures, which are packaged into monitored data and transmitted to the media monitoring entity. The media monitoring entity can match the audio signatures to reference signatures associated with the media asset. As used herein, the "primary language" of a media asset is the presentation language of media asset in which a media monitoring entity has generated reference audio signatures. A media asset can have multiple primary languages (e.g., a Canadian broadcast can have reference signatures generated in both English and French, etc.) As used herein, "alternate languages" or "alternative languages" of a media asset are presentation languages for which the media monitoring entity did not generate reference signatures.

In some examples, media assets do not include audio codes so crediting exposure for viewership of media asset via watermarks is not possible. In some examples, panelists can view a media asset in an alternative language (e.g., a non-English language, a foreign language, etc.). In such examples, some of the generated audio signatures will match the reference signatures associated with the media asset (e.g., the audio signatures associated with the non-dialogue portions of the media asset, etc.) and some of the generated audio signatures will not match the reference signatures associated with the media asset (e.g., the audio signatures associated with dialogue portions of the media asset, etc.). As such, detecting and crediting viewership of an alternative-language counterpart of a media asset may be difficult due to the inconsistent reliability of matching using signatures generated from the primary-language counterpart.

Examples disclosed herein overcome the above noted difficulties by determining if the pattern of matching between reference signatures and audio signatures is indicative of viewership of an alternative-language asset. In some examples disclosed herein, the collected monitored data is segmented into segments of strong matches and segments of weak matches In some examples disclosed herein, the segments are divided based on a signature match rate of the monitoring satisfying a strong matches threshold. In some examples disclosed herein, the monitored data is credited to an alternative-language asset if the segments alternate between strong matches and weak matches and each segment satisfies a length threshold.

FIG. 1 is a block diagram of an example environment 100 in which the teachings of this disclosure may be implemented. The example environment 100 includes an example first media meter 102A, an example second media meter 102B, and an example third media meter 102C, which output example first monitored data 104A, example second monitored data 104B, and example third monitored data 104C, respectively, to an example network 106. The environment 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) respective media devices. For example, a media device associated with one of the media meters 102A, 102B, 102C presents media (e.g., via a display, etc.). In some examples, the media device associated with one of the media meters 102A, 102B, 102C additionally or alternatively presents the media on separate media presentation equipment (e.g., speakers, a display, etc.). For example, the media device(s) associated with the media meters 102A, 102B, 102C can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™ etc.), digital media players (e.g., a Roku® media player, a Slingbox®, a Tivo®, etc.), televisions, desktop computers, laptop computers, servers, and/or any other device capable of viewing streaming media. In such examples, the media meters 102A, 102B, 102C may have direct connections (e.g., physical connections) to the devices to be monitored, and/or may be connected wirelessly (e.g., via Wi-Fi, via Bluetooth, etc.) to the devices to be monitored.

Additionally or alternatively, in some examples, one or more of the media meters 102A, 102B, 102C are portable meters carried by one or more individual people. In the illustrated example, the media meters 102A, 102B, 102C monitor media presented to one or more people associated with the media meters 102A, 102B, 102C and generate the example monitored data 104A, 104B, 104C. In some examples, monitored data 104A, 104B, 104C generated by the media meters 102A, 102B, 102C includes signatures associated with the presented media. For example, the media meters 102A, 102B, 102C can determine signatures (e.g., generate signatures, extract signatures, etc.) whenever media is presented on the associated media devices. Accordingly, the monitored data 104A, 104B, 104C can include determined signatures based on the media monitored by the media meters 102A, 102B, 102C. In some examples, the monitored data 104A, 104B, 104C is associated with a discrete, measurement time period (e.g., five minutes, ten minutes, etc.).

Example signature generation techniques that may be implemented by the meters 102A, 102B, 102C include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

The example network 106 is a network used to transmit the monitored data 104A, 104B, 104C to the data center 108. In some examples, the network 106 can be the Internet or any other suitable external network. In other examples, the network 106 can be a cable broadcast system and the monitored data 104A, 104B, 104C could be return path data (RPD). In other examples, any other suitable means of transmitting the monitored data 104A, 104B, 104C to the data center 108 can be used.

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS®, etc.). In this example, the data center 108 can further store and process generated watermark and signature reference data.

The example meter data analyzer 110 processes the gathered media monitored data to identify the respective media associated with the corresponding monitored data 104A, 104B, 104C. For example, the meter data analyzer 110 can compare the monitored data 104A, 104B, 104C to generated reference data to determine what respective media is associated with the corresponding monitored data 104A, 104B, 104C. In some examples, the meter data analyzer 110 can hash the signatures included in the monitored data 104A, 104B, 104C. In some examples, the meter data analyzer 110 can identify the media by matching unhashed signatures and/or hashed signatures. The meter data analyzer 110 of the illustrated example also analyzes the monitored data 104A, 104B, 104C to determine if the monitored data is associated with an alternative-language counterpart of an media asset stored in the SVOD reference signature database. In such examples, the monitored data 104A, 104B, 104C includes monitored data segments associated with strongly matches corresponding reference segments of an primary-language media asset (e.g., portions of the monitored data associated with presentation of non-dialogue portions of the SVOD, etc.), and other monitored data segments associated with weak matches corresponding reference segments of the primary language media asset (e.g., portions of the monitored data associated with presentation of dialogue portions of the media asset, etc.).

The example identification data 112 includes information to credit user(s) associated with the media meters 102A, 102B, 102C with exposure to one or more particular media assets. For example, the identification data 112 can include direct associations between monitored data 104A, 104B, 104C and one or more particular media assets. For example, the identification data 112 can include media identifiers associated with the media assets represented in the monitored data 104A, 104B, 104C, and timestamps associated with the periods of exposure to that media. The example media exposure creditor 114 uses the identification data 112 to credit user(s) with exposure. In some examples, the media exposure creditor 114 generates a report including data metrics that may be presented to media providers. In some examples, if the meter data analyzer 110 determines the monitored data 104A indicated a user was exposed to an alternative language version of an asset, the identification data 112 can include media identifiers associated with the primary-language version of that asset.

While examples disclosed herein are described with reference to generating the identification data 112 and crediting user(s) with exposure to media assets, the examples disclosed herein are not limited to media monitoring applications. Instead, the teachings of this disclosure can be applied to any appropriate field. For example, the teachings of this disclosure can be applied to language education, translation services, surveillance, etc.

Figure 2:
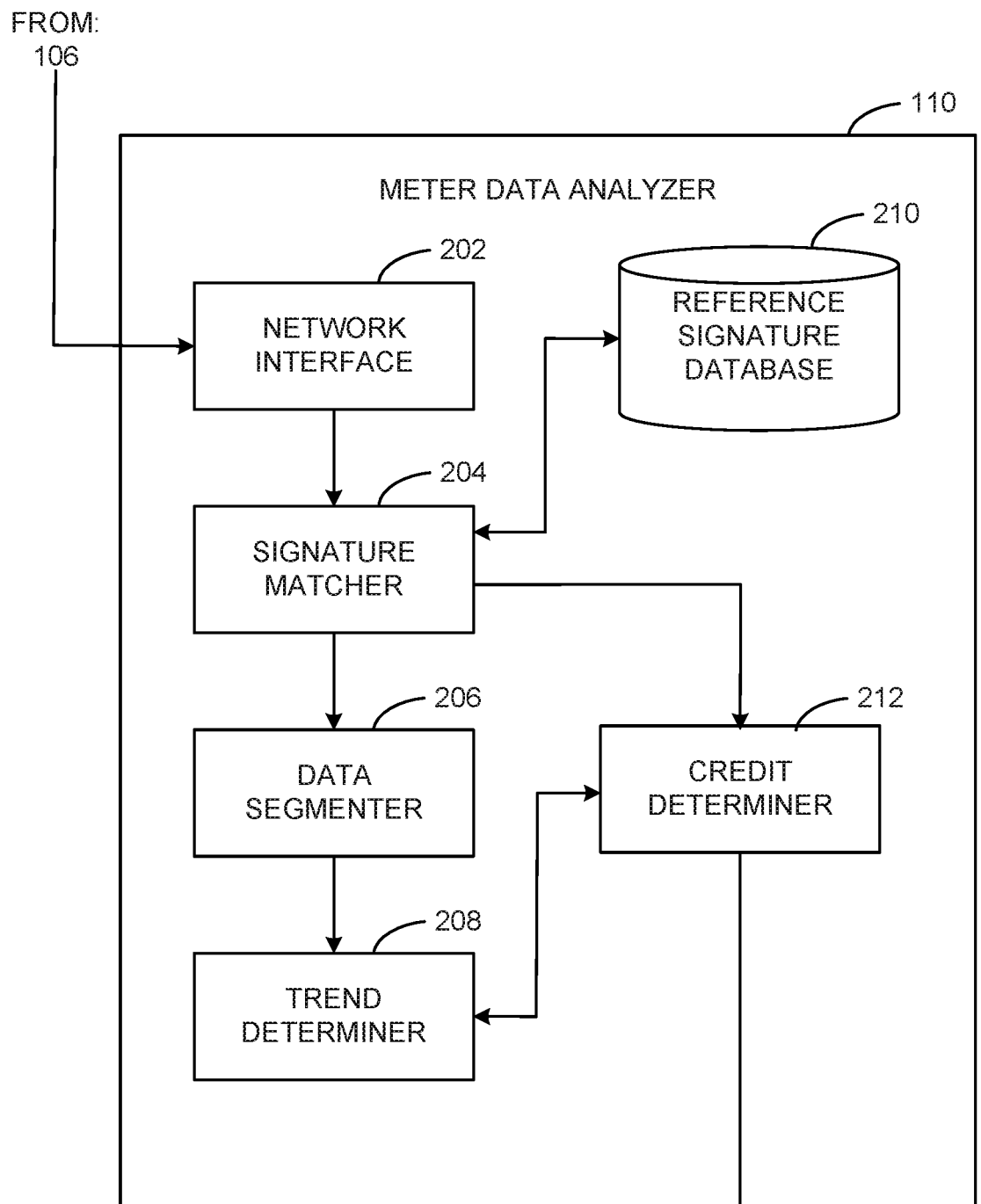
FIG. 2 is a block diagram of an example implementation of a meter data analyzer included in the example environment of FIG. 1.

FIG. 2 is a block diagram of an implementation of the meter data analyzer 110 of FIG. 1. In the illustrated example, the meter data analyzer 110 includes an example network interface 202, an example signature matcher 204, an example data segmenter 206, an example trend determiner 208, an example reference signature database 210, and an example credit determiner 212.

The example network interface 202 allows the meter data analyzer 110 to receive the monitored data 104A, 104B, 104C from the example network 106. In some examples, the network interface 202 can convert the monitored data 104A, 104B, 104C into a format readable by the meter data analyzer 110. In some examples, the network interface 202 can be in continuous communication with the network 106, the first media meter 102A, the second media meter 102B, and/or the third media meter 102C. In other examples, the network interface 202 can be in intermittent (e.g., periodic or aperiodic) communication with the network 106, the first media meter 102A, the second media meter 102B, and/or the third media meter 102C. In some examples, the network interface 202 can be absent. In such examples, the media meters 102A, 102B, 102C can be in direct communication with the meter data analyzer 110. For example, if the meter data analyzer 110 is implemented via a cloud service, some or all of the media meters 102A, 102B, 102C can directly upload the monitored data 104A, 104B, 104C directly to the cloud service.

The operation of the signature matcher 204, the example data segmenter 206, the example trend determiner 208, the example reference signature database 210, and the example credit determiner 212 are described with reference to the first monitored data 104A. In some examples, similar operations are performed by the signature matcher 204, the example data segmenter 206, the example trend determiner 208, the example reference signature database 210, and the example credit determiner 212 on the second monitored data 104B, the third monitored data 104C, etc.

The example signature matcher 204 compares signatures of the monitored data 104A and the signatures in the example the reference signature database 210 to identify matches. For example, the signature matcher 204 can determine if the signatures of the monitored data 104A match any reference signatures stored in the reference signature database 210. In some examples, some or all of the signatures of the monitored data 104A can match with corresponding reference signatures in the reference signature database 210 that represent a piece of reference media (e.g., reference signatures associated with a television episode, etc.). In some examples disclosed herein, the signature matcher 204 may perform matching using any suitable means (e.g., linear matching, hashed matching, etc.) and/or comparison criteria, such as those described above. The signature matcher 204 determines the strength of the signature matching throughout the monitored data.

As used herein, a "strong match" and a "weak match" are based on the number of signature matches that occur within a period of time (e.g., 1 second, 2 seconds, etc.), referred to herein as an "evaluation period." For example, a strong match can correspond to relatively high number of signature matches in a period of time (e.g., five signature matches per second, etc.) and a weak match can correspond to relatively low number of signature matches in a period of time (e.g., less than 1 signature match per second, etc.). In some examples disclosed herein, one or more example matching strength thresholds are used to categorize a segment of media as either a weak matched segment or a strong matched segment. For example, a matching strength threshold of 3 matches per second can cause portions of the media data with greater than 3 matches per second (e.g., 4 matches per second, 8 matches per second, etc.) to be categorized as strong matched segments and portions of the data with less than 3 matches per second (e.g., 1 matches per second, etc.) as weak matched segments. In some examples, multiple matching strength thresholds can be used. For example, portions of data can be compared to a weak matching threshold (e.g., 1 match per second) and to a strong matching threshold (e.g., 5 matches per second, etc.) greater than the weak matching threshold. In such examples, if the match rate of the signatures of the portion of the monitored data is greater than the weak matching threshold but less than the strong matching threshold, the portion of the monitored data is categorized as a weak matched segment, and if the match rate of the signatures of the portion of the monitored data is greater than the strong matching threshold, the portion of the monitored data is categorized as a strong matched segment. In other examples, any other suitable criteria (e.g., match fidelity of the signature matching, pattern of the signature matching, etc.) can correspond to strong matches and weak matches.

The example data segmenter 206 segments the received monitored data 104A into time segments (e.g., divides the time represented by the monitored data 104A) corresponding to the match strength of the monitored data 104A. For example, the data segmenter 206 can divide the monitored data 104A into time segments corresponding to temporally adjacent evaluation periods of the monitored data 104A associated with strong matches to a single media asset and into time segments corresponding to temporally adjacent evaluation periods of the monitored data 104A associated with weak matches to that single media asset. For example, when the monitored data 104A is strongly matched to a single media asset throughout the length of the monitored data 104A, the data segmenter 206 divides the monitored data 104A into a single segment. However, when the monitored data 104A alternates between one or more successive evaluation periods associated with strong matches and one or more successive evaluation periods associated with weak matches, the data segmenter 206 divides the monitored data 104A into segments corresponding to the evaluation periods associated with weak matches and into segments associated with the evaluation periods associated with strong matches. Example outputs of the data segmenter 206 are described below in conjunction with FIGS. 3A-3D.

The example trend determiner 208 analyzes the output of the data segmenter 206 to determine if the monitored data 104A is associated with an alternative-language counterpart of a media asset. In some examples, the trend determiner 208 determines if the segments output by the data segmenter 206 satisfy an asset matching threshold. In some examples, the asset matching threshold corresponds to each segment matching the same media asset. In other examples, the asset matching threshold can correspond to another percent of segment matching (e.g., 90%, 75%, etc.).

For example, if the trend determiner 208 determines the monitored data 104 corresponding to a single media asset alternates between weak matched segments and strong matched segments, the trend determiner 208 can determine the monitored data 104A is associated with an alternative-language counterpart of a media asset. In some examples, the trend determiner 208 can also base the determination on the length of each time segment associated with weak matches and each time segment associated with strong matches. For example, the trend determiner 208 can compare the length of each alternating time segment with a threshold length period (e.g., one minute, etc.). In such examples, if each time segment satisfies the time threshold, the trend determiner 208 can determine the monitored data 104A is associated with an alternative-language counterpart of a media asset. In other examples, the trend determiner 208 can determine if the monitored data 104A is associated with an alternative language counterpart of a media asset by any other available criteria (e.g., if a majority of time segments satisfy the time threshold, if a threshold percentage of the time thresholds satisfy the time threshold, etc.).

The example reference signature database 210 includes generated reference signatures created or otherwise obtained by the data center 108. In some examples, the reference signature database 210 includes reference unhashed signatures and/or referenced hashed signatures associated with reference media. In some examples, the media monitoring entity associated with the reference signature database 210 can directly monitor media source feeds to generate reference unhashed signatures and/or hashed signatures. In some examples, the media monitoring entity can generate the reference signatures by any other suitable means (e.g., from downloaded reference media, from reference media on a physical medium, etc.). In some examples, each reference signature stored in the reference signature database 210 is associated with a particular video on-demand media asset (e.g., an episode of television series available via streaming, etc.). In some examples, the reference signature database 210 does not include alternative language counterparts to media assets in the reference signature database 210 (e.g., the reference signature database 210 includes an English version of a media asset but does not include a Spanish dubbed version of the media asset, etc.).

The example credit determiner 212 generates the identification data 112 based on the output of the signature matcher 204 and the trend determiner 208. In some examples, the credit determiner 212 can generate identification data 112 including media identifiers, duration of the match to one or more media asset(s), strength of the match to one or more media asset(s), etc.). In some examples, the credit determiner 212 identifies media asset(s) that are associated with the matched signatures so the identified media assets can be credited by the media exposure creditor 114. In some examples, if the trend determiner 208 determines monitored data 104A is associated with an alternative language counterpart of an media asset, the credit determiner 212 can identify the English language media asset in the identification data 112. The example credit determiner 212 transmits the identification data 112 to the media exposure creditor 114.

While an example manner of implementing the meter data analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example signature matcher 204, the example data segmenter 206, the example trend determiner 208, the reference signature database 210, the example credit determiner 212 and/or, more generally, the example meter data analyzer 110 of FIG. 2 may be implemented by hardware, software, firmware and/or any combination of hardware, software and/or firmware. Thus, for example, any of the example network interface 202, the example signature matcher 204, the example data segmenter 206, the example trend determiner 208, the reference signature database 210, the example credit determiner 212 and/or, more generally, the example meter data analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 202, the example signature matcher 204, the example data segmenter 206, the example trend determiner 208, the reference signature database 210, the example credit determiner 212 and/or the example meter data analyzer 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 3A is a block diagram of a first example output 300A of the example data segmenter 206 of FIG. 2. The example output 300A includes portions of example monitored data 302A having different match strengths 304. In the illustrated example of FIG. 3A, the example monitored data 304A has been segmented into an example first segment 306, an example second segment 308, an example third segment 310, an example fourth segment 312 and an example fifth segment 314. In the illustrated example of FIG. 3A, the segment 306 has an example first length 316, the segment 308 has an example second length 317, the segment 310 has an example third length 319, the segment 312 has an example fourth length 321, and the segment 314 has an example fifth length 323.

In the illustrated example of FIG. 3A, the first segment 306, the third segment 310 and the fifth segment 314 have weak match strengths. For example, the evaluation periods of the monitored data 302A corresponding to the first segment 306A, the third segment 310 and the fifth segment 314 have signature match rates not satisfying a match strength threshold (e.g., each of those segments includes less than five signature matches per second, etc.), or satisfying a weak match threshold but not satisfying a strong match threshold, etc. In the illustrated example of FIG. 3A, the second segment 308 and the fourth segment 312 have strong match strengths. For example, the evaluation periods of the monitored data corresponding to the second segment 308 and the fourth segment 312 have signature match rates satisfying the match strength threshold (e.g., each of those segments includes at least 5 signature matches per second, etc.), or satisfying a strong match threshold that is greater than a weak match threshold, etc.

In the illustrated example of FIG. 3A, the lengths 316, 317, 319, 321, 323 of each of the segments 306, 308, 310, 312, 314 are approximately the same duration and each length 316, 317, 319, 321, 323 satisfies a length threshold (e.g., one minute, etc.). In other examples, the different segments may have different lengths that satisfy the length threshold, any/or other suitable length threshold(s) can be used (e.g., 30 seconds, 45 seconds, 90 seconds, three minutes, etc.). Based on the lengths 316, 317, 319, 321, 323 satisfying the length threshold and the alternating pattern of segments with weak matches and segments with strong matches, the trend determiner 208 can determine the monitored data 302A corresponds to a alternative-language counterpart of a media asset. In the illustrated example, the lengths 316, 317, 319, 321, 323 each of the segments 306, 308, 310, 312, 314 are approximately the same duration. In other examples, some or all of the segments 306, 308, 310, 312, 314 can have any other suitable length(s) that satisfy the length threshold.

FIG. 3B is a block diagram of a second example output 300B of the example data segmenter 206 of FIG. 2. The example output 300B includes portions of example monitored data 302B having different match strengths 304. In the illustrated example of FIG. 3B, the example monitored data 304B has been segmented into an example first segment 318 and an example second segment 320. In the illustrated example of FIG. 3B, the example first segment 318 has an example first length 322 and the second segment has an example second length 325.

In the illustrated example of FIG. 3B, the example first segment 318 has a strong match strength to a media asset and the example segment 320 has a weak match strength to the media asset. For example, the first segment 318 has a signature match rate that satisfies a match strength threshold and the second segment 320 does not satisfy the match strength threshold. In the illustrated example of FIG. 3B, both of the lengths 322 and 325 satisfy the length threshold. In the illustrated example of FIG. 3B, despite the lengths 322 and 325 satisfying the length threshold, the trend determiner 208 would determine that the monitored data 302B is not associated with an alternative-language counterpart of the media asset because the segments do not alternate between strong matches and weak matches.

FIG. 3C is a block diagram of a third example output 300C of the example data segmenter 206 of FIG. 2. The example output 300C includes portions of example monitored data 302B having different match strengths 304. In the illustrated example of FIG. 3C, the example monitored data 304C has been segmented into an example first segment 324, an example second segment 326, and an example third segment 328. In the illustrated example of FIG. 3C, the example first segment 324 has an example first length 327, the example second segment 326 has an example second length 329, and the example third segment 328 has an example third length 330.

In the illustrated example of FIG. 3C, the example second segment 326 has a strong match strength to a media asset and the example segments 324, 328 have a weak match strength to the media asset. For example, the second segment 326 has a signature match rate that satisfies the match strength threshold. For example, the first segment 324 and the third segment 328 have signature match strengths that do not satisfy the match strength threshold. In the illustrated example of FIG. 3C, each of the lengths 327, 329, 330 satisfy the minimum length threshold. Based on the lengths 327, 329, 330 satisfying the length threshold and the alternating pattern of the weak matched segments (e.g., the second segment 326, etc.) and strong matched segments (e.g., the first segment 324 and the third segment 326, etc.), the trend determiner 208 can determine the monitored data 302C corresponds to an alternative language counterpart of the media asset.

FIG. 3D is a block diagram of a fourth example output 300D of the example data segmenter 206 of FIG. 2. The example output 300C includes portions of example monitored data 302B having different match strengths 304. In the illustrated example of FIG. 3D, the example monitored data 304D has been segmented into an example first segment 331, an example second segment 332, and an example third segment 334. In the illustrated example of FIG. 3D, the example first segment 331 has the example first length 333, the example second segment 332 has an example second length 336 and the example third segment 334 has an example third length 338.

In the illustrated example of FIG. 3D, the example segments 331, 334 have a strong match strength to a media asset and the example segment 332 has a weak match strength to the media asset. For example, the second segment 332 has a signature match rate that does not satisfy the match strength threshold. For example, the first segment 331 and the third segment 334 have signature match strengths that satisfies the match strength threshold. In the illustrated example of FIG. 3D, the first length 333 and third length 338 satisfy the length threshold and the second length 336 does not satisfy the length threshold. In the illustrated example of FIG. 3D, despite the alternating pattern of weak and strong signature match strengths, the trend determiner 208 would determine that the monitored data 302B is not associated with an alternative-language counterpart of the media asset based on the second length 336 not satisfying the minimum length threshold.

Figure 4:
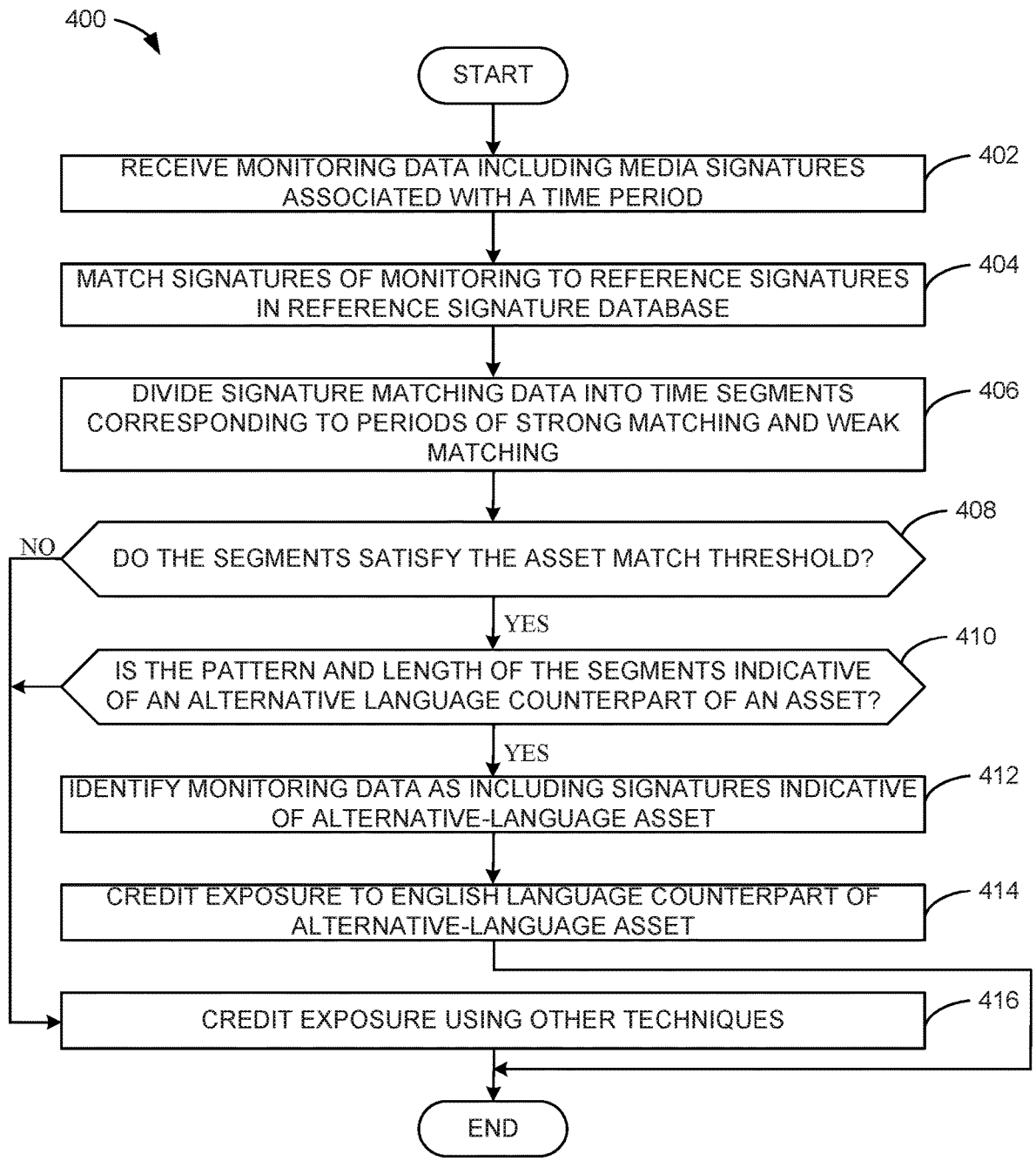
FIG. 4 is a flowchart representative of machine readable instructions which may be executed to implement the meter data analyzer of FIGS. 1 and/or 2.

A flowchart representative of example hardware logic, machine readable instructions, hardware implemented state machines, and/or any combination thereof for implementing the meter data analyzer 110 of FIG. 2 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example meter data analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The process 400 of FIG. 4 includes block 402. At block 402, the network interface 202 receives monitored data including media signatures associated with a time period. For example, the network interface 202 can request and/or otherwise request the monitored data 104A, 104B, 104C from the media meters 102A, 102B, 102C, respectfully. The remainder of the process 400 of FIG. 4 is described with reference to the monitored data 104A. However, the process 400 is also applicable to any other monitored data described in this disclosure (e.g., the monitored data 104B, 104C, 302A, 302B, 302C, 302D, etc.). In some examples, the network interface 202 can convert the monitoring data into a format readable by the meter data analyzer 110. In some examples, the network interface 202 can analyze the metadata (e.g., timestamps, etc.) associated with the monitored data 104A to determine one or more time periods associated with the monitored data 104A.

At block 406, the signature matcher 204 matches signatures to reference signature in reference signature database 210. For example, the signature matcher 204 can compare the signatures in the monitored data 104A with reference signatures in the reference signature database 210 corresponding to a media asset. In some examples, the signature matcher 204 can use linear and/or hashed matching to match the signatures of the monitored data 104A to signatures in the reference signature. In some examples, the signature matcher 204 can determine the match strength (e.g., the signature match rate to single asset, etc.) to various portions of the monitored data 104A. At block 410, the data segmenter 206 divides signature matching data into segments corresponding to periods of strong matches and periods of weak matches. For example, the data segmenter 206 can identify portions of the monitored data 104A with strong match strengths to the media asset as strong matched segments (e.g., the segments 308, 312 of FIG. 3A, etc.). Similarly, the data segmenter 206 can identify portions of the monitored data with weak match strengths to the media asset as weak matched segments (e.g., the segments 306, 310, 314 of FIG. 3A, etc.). In other examples, the data segmenter 206 can divide the monitored data 104A into segments based on any other suitable method.

At block 408, the trend determiner 208 determines if the generated segments satisfy the asset match threshold. For example, the trend determiner 208 can determine if each segment includes signatures that match a single media asset and, thus, satisfy the asset match threshold. In other examples, the asset match threshold can correspond to a different percentage of segments matching a single asset (e.g., 75%, 90%, etc.). If the trend determiner 208 determines the segments satisfy the asset match threshold, the process 400 advances to block 410. If the trend determiner 208 determines the segments do not satisfy the asset match threshold, the process 400 advances to block 416.

At block 410, the trend determiner 208 determines if the pattern and length of the segments is indicative of an alternative-language counterpart of a media asset. For example, the trend determiner 208 can determine if each segment generated by the data segmenter 206 satisfies a length threshold and if the segments alternate between strong matches and weak matches. In other examples, the trend determiner 208 can determine if the pattern and length of the segments is indicative of an alternative language counterpart of a media asset by any other suitable means. If the trend determiner 208 determines the pattern and length of the segments is indicative of an alternative language counterpart of a media asset, the process 400 advances to block 412. If the trend determiner 208 determines the pattern and length of the segments is not indicative of a foreign language counterpart of a media asset, the process 400 advances to block 416.

At block 412, the trend determiner 208 identifies the monitoring data 104A as including signatures indicative of alternative-language asset. For example, the trend determiner 208 can determine that the signatures are indicative of alternative-language asset of a primary language asset with signatures stored in the reference signature database 210.

At block 414, the credit determiner 212 credits exposure to the single media asset identified in the monitored data. For example, in response to the trend determiner 208 determining the monitored data 104A is indicative of an alternative language counterpart of a media asset, the credit determiner 212 can associate the monitored data 104A with the media asset. After the execution of block 416, the process 400 ends.

At block 416, the signature matcher 204 credits exposure to media corresponding to the monitored data by other means. For example, the signature matcher 204 can credit exposure to the media corresponding the monitored data using linear matching, non-linear matching and/or code matching. In other examples, the signature matcher 204 can determine the media associated with the monitored data 104A using any other suitable means.

Figure 5:
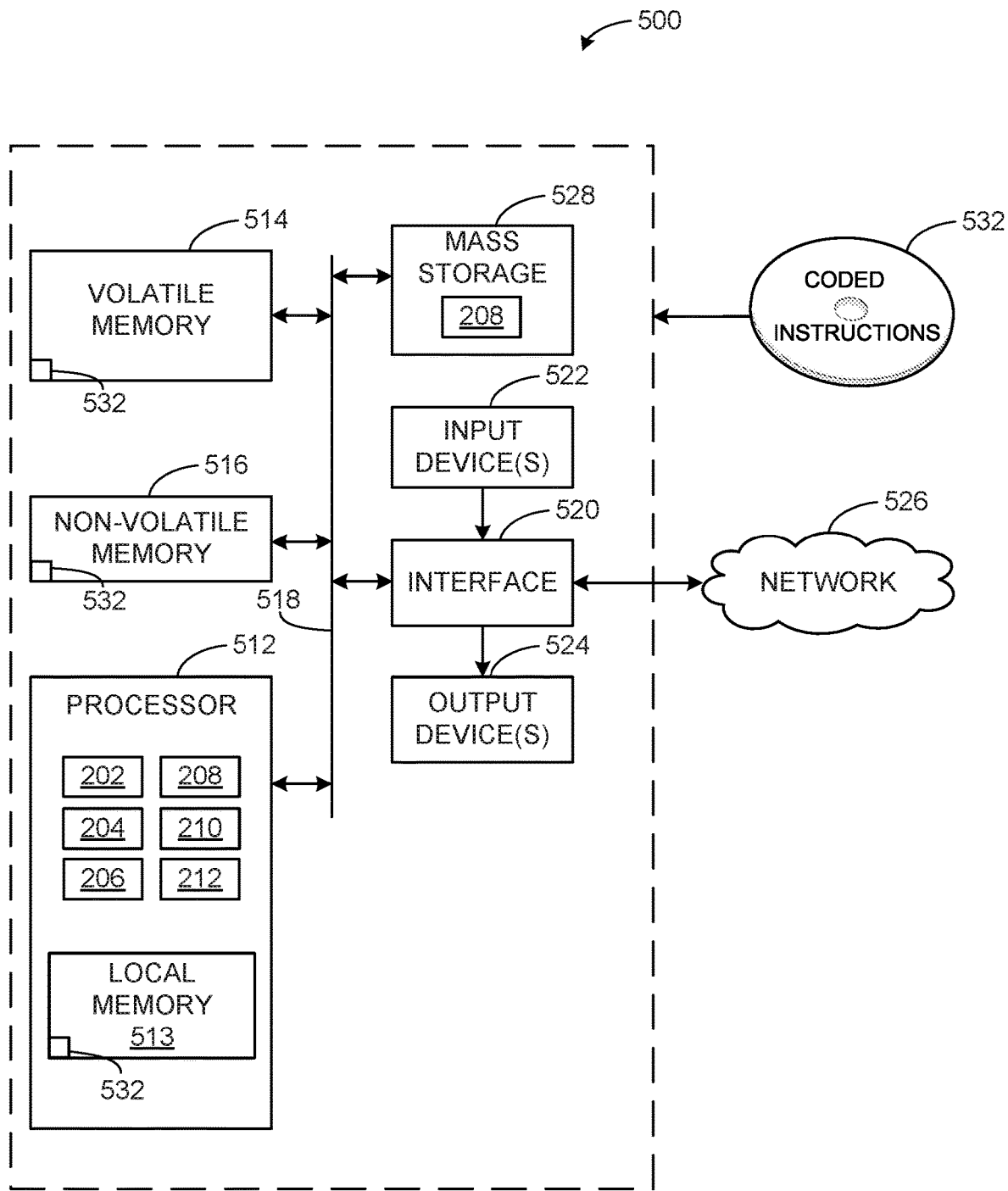
FIG. 5 is a block diagram of an example processing platform structured to execute the instructions of FIG. 4 to implement the meter data analyzer of FIGS. 1 and/or 2.

FIG. 5 is a block diagram of an example processor platform 500 structured to execute the instructions of FIG. 4 to implement the meter data analyzer 110 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, signature matcher 204, the data segmenter 206, the trend determiner 208 and the credit determiner 212.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that allow for reference signature matching. Example disclosed methods, apparatus and articles of manufacture improve the efficiency of using a computing device by reducing computational and storage requirements of systems that identify media using signatures. For example, disclosed examples allow monitored data to be credited to alternate language counterparts of a media asset without storing reference signatures associated with the foreign language counterpart. The disclosed methods, apparatus and articles of manufacture are accordingly directed to one or more improvement(s) in the functioning of a computer.

What is claimed is:

1. A method comprising:
    obtaining a sequence of monitored signatures generated from monitored data of monitored media by one or more audience measurement meters;
    identifying, based on the sequence of monitored signatures, first segments and second segments of the sequence of the monitored signatures based on: (i) ones of the sequence of monitored signatures in the first segment satisfying a matching criterion with respect to reference signatures of a media asset, and (ii) ones of the sequence of monitored signatures in the second segment not satisfying the matching criterion with respect to reference signatures of the media asset;
    determining that the identified first segments and second segments exhibit a characteristic pattern;
    determining, based on determining that the identified first segments and second segments exhibit the characteristic pattern, that the monitored media is an alternative language version of the media asset; and
    crediting exposure to the alternative language version of the media asset, wherein crediting exposure to the alternative language version of the media asset comprises:
        transmitting identification data about the alternative language version of the media asset to a media exposure creditor implemented at a data center; and
        outputting, at a media exposure creditor implemented by a data center, data metrics based on the identification data.

2. The method of claim 1, wherein the identification data includes a media identifier that is a name of the media asset or a metadata tag.

3. The method of claim 1, further comprising:
    determining that the monitored data of monitored media corresponds to the media asset of reference media assets having the reference signatures.

4. The method of claim 3, wherein determining that the monitored data of the monitored media corresponds to the media asset comprises:
    using linear or hashed matching to match signatures of the monitored data to the reference signatures of the reference media assets; and
    comparing the sequence of monitored signatures with a sequence of the reference signatures to determine signature matches associated with portions of monitored data corresponding to the monitored media, the reference signatures associated with a primary language version of the reference media assets.

5. The method of claim 1, wherein determining that the identified first segments and
    second segments exhibit the characteristic pattern comprises:
        during an evaluation period of the monitored data,
            (i) determining that signature matches of the ones of the first segments to the reference signatures satisfy the matching criterion; and
            (ii) determining that signature matches of the ones of the second segments to the references signatures do not satisfy the matching criterion.

6. The method of claim 1, wherein the monitored media is accessed via a streaming service of a streaming video provider.

7. The method of claim 1, wherein the determination of the monitored media as the alternative language version of the media asset is additionally based on corresponding lengths of the first segments and the second segments.

8. The method of claim 1, wherein the first segments are associated with nondialogue portions of the alternate language version of the media asset and the second segments are associated with dialogue portions of the alternate language version of the media asset.

9. A non-transitory computer-readable storage medium, having stored thereon program instructions that, upon execution by a processor, cause performance of operations comprising:
- obtaining a sequence of monitored signatures generated from monitored media by one or more audience measurement meters;
- identifying, based on the sequence of monitored signatures, first segments and second segments of the sequence of the monitored signatures based on: (i) ones of the sequence of monitored signatures in the first segment satisfying a matching criterion with respect to reference signatures of a media asset, and (ii) ones of the sequence of monitored signatures in the second segment not satisfying the matching criterion with respect to reference signatures of the media asset;
- identifying the monitored media as an alternative language version of the media asset based on the first segments and the second segments exhibiting a characteristic pattern;
- generating identification data of the alternative language version of the media asset based on the identification of the monitored media as the alternate language version of the media asset;
- transmitting the identification data to a media exposure creditor implemented at a data center; and
- outputting, at the media exposure creditor implemented by the data center, data metrics based on the identification data.

10. The non-transitory computer-readable storage medium of claim 9, the operations further comprising:
- determining that the monitored data corresponds to the media asset of reference media assets, wherein the determining comprises:
  - using linear or hashed matching to match signatures of the monitored data to the reference signatures of reference media assets; and
  - comparing the sequence of monitored signatures with a sequence of the reference signatures to determine signature matches associated with portions of monitored data corresponding to the monitored media, the reference signatures associated with a primary language version of the reference media assets.

11. The non-transitory computer-readable storage medium of claim 9, wherein the data metrics include data that credits audience exposure to the alternative language version of the media asset.

12. The non-transitory computer-readable storage medium of claim 9, wherein outputting, at the media exposure creditor implemented by the data center, data metrics includes operations further comprising:
- generating a report including the data metrics.

13. The non-transitory computer-readable storage medium of claim 9, wherein identifying the first segments and the second segments of the sequence of the monitored signatures further comprises operations:
- during an evaluation period of the monitored data,
  - (i) determining that signature matches of the ones of the first segments to the reference signatures satisfy the matching criterion; and
  - (ii) determining that signature matches of the ones of the second segments to the references signatures do not satisfy the matching criterion.

14. The non-transitory computer-readable storage medium of claim 9, wherein the alternative language version of the media asset includes a dialogue that is different from a dialogue of a primary language version of the reference media assets.

15. The non-transitory computer-readable storage medium of claim 9, wherein the monitored media is accessed via a streaming service of a streaming video provider.

16. The non-transitory computer-readable storage medium of claim 9, wherein the identification data includes a media identifier that is a name of the media asset or a metadata tag.

17. A system comprising:
- a media meter configured to monitor a media device and to obtain monitored data about the media device having accessed a streaming service of a streaming video provider;
- a media exposure creditor implemented at a data center and configured to credit audience exposure of the monitored data;
- a processor; and
- a non-transitory computer-readable storage medium, having stored thereon program instructions that, upon execution by the processor, cause performance of operations comprising:
  - obtaining a sequence of signatures representative of the monitored data;
  - dividing the sequence of signatures representative of the monitored data into first segments and second segments, ones of the first segments including portions of the monitored data having signature matches that satisfy a threshold and ones of the second segments including portions of the monitored data having signature matches that do not satisfy the threshold;
  - identifying the monitored media as an alternative language version of a media asset based on the first segments and the second segments having an alternating pattern of signature matches;
  - generating identification data of the alternative language version of the media asset based on the identification of the monitored media as the alternate language version of the media asset;
  - transmitting the identification data to the media exposure creditor, wherein the identification data includes a media identifier that is a name of the media asset or a metadata tag; and
  - outputting, at the media exposure creditor, data metrics based on the identification data.

18. The method of claim 1, wherein the media asset is one of a commercial, a song, a movie, or an episode of a television show.

19. The non-transitory computer-readable storage medium of claim 9, wherein the media asset is one of a commercial, a song, a movie, or an episode of a television show.

20. The system of claim 17, wherein the media asset is one of a commercial, a song, a movie, or an episode of a television show.

* * * * *